UNITED STATES PATENT OFFICE.

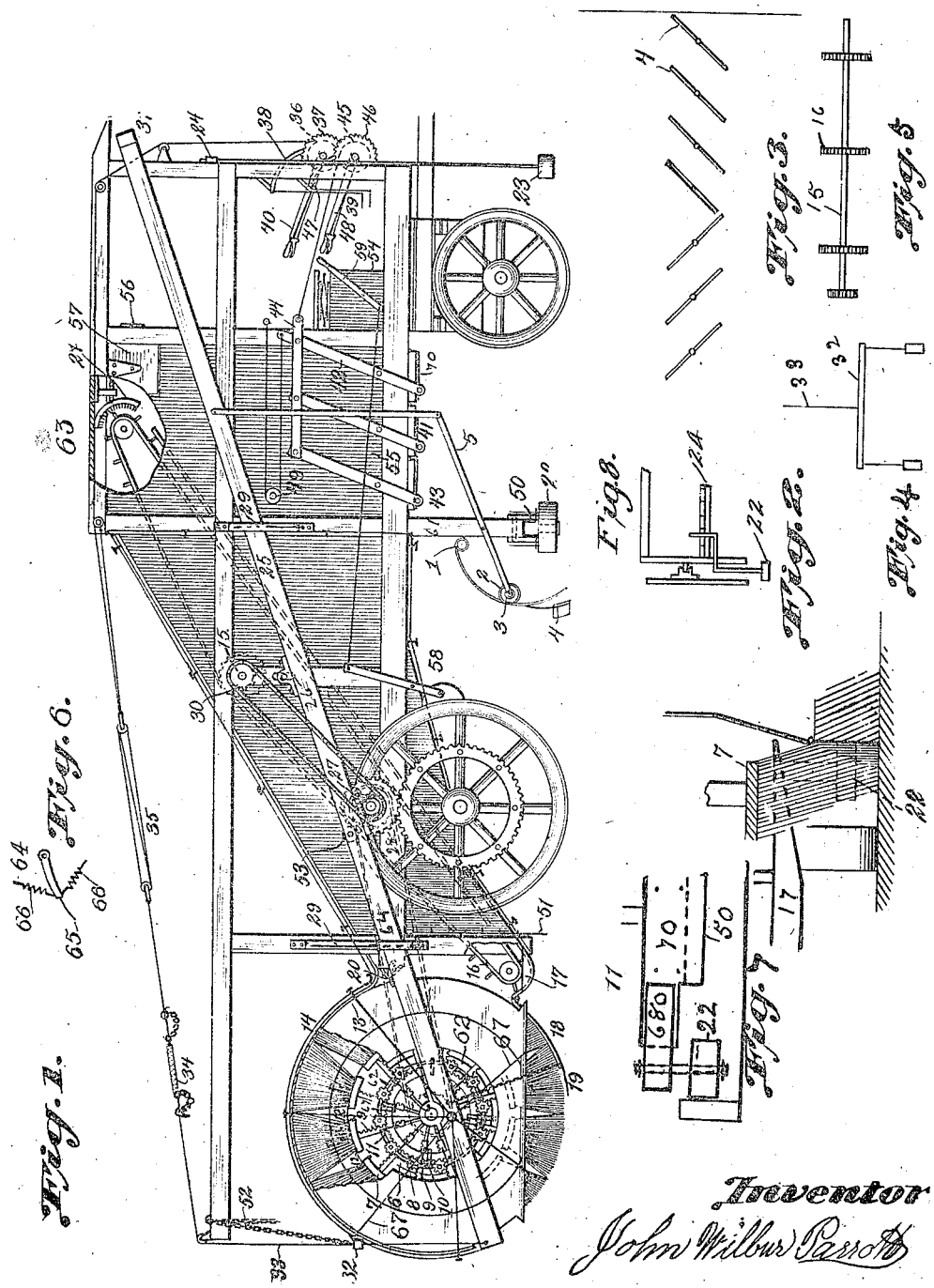

JOHN WILBUR PARROTT, OF BETHAYRES, PENNSYLVANIA.

STREET-CLEANING AND DISPOSING MACHINE AND ART OF CLEANING PAVED STREETS AND DISPOSING OF THE CLEANINGS.

1,243,866.  Specification of Letters Patent.  Patented Oct. 23, 1917.

Continuation of application Serial No. 2,505, filed January 15, 1915. This application filed October 31, 1916. Serial No. 128,678.

*To all whom it may concern:*

Be it known that I, JOHN WILBUR PARROTT, a citizen of the United States, address at Bethayres, in the county of Montgomery and State of Pennsylvania, have invented a new and useful Street-Cleaning and Disposing-Machine, and the Art of Cleaning Paved Streets and Disposing of the Cleanings, of which the following is a specification, reference being had to the accompanying drawings, and the figures of reference marked thereon, making part of this specification, being a new application for the subject-matter embraced in my application dated the twenty-sixth day of January, 1914, and filed as of the fifteenth day of January, 1915, Serial Number 2,505, excluding the combined plow-plane and grader and combined sprinkler and flusher and roller and including the check-chain springs and guide-wheel and a fuller description of the construction and operation of my invention and the several parts thereof, as will hereinafter appear.

The objects of my invention are, to clean paved streets from curb to curb, with greater efficiency, economy, and conserve the public health, with a single machine, that can be operated by one person, and dispose of the cleanings, instead of using men to gather the debris and manure, water to soften the substances that adhere to the pavement, a diagonal brush, or rubber flanges to loosen and sweep or shove the cleanings to form wind-rows in or near the gutters, a portion of which flow into the basins of and clog the sewers, the remainder being swept by hand sweepers into piles, and wagons to gather them, or in part by using self loading machines so constructed as not to clean the gutters at all, or the street elsewhere after their brushes are reduced in size by wear, which are the prevailing methods.

Figure 1. is a side elevation of the machine. Fig. 2. is a detached cross section through one end of the brush and adjacent curb. disk and end of the elevator pocket. Fig. 3. is a plan view of the hoes. Fig. 4. is a diagrammatic view of the brush suspension. Fig. 5. is a view of the elevator driving shaft. Fig. 6. is a view of the comb-scraper, and Fig. 7. is view of the folding guide-wheel. Fig. 8 is a view showing the index scale of the front guide-wheel, and also showing the interlocking brackets of the main levers.

A frame having extensions to receive a combined rake and series of hoes, a guide wheel and levelers, mounted on the running gear of a vehicle, with braces as a substitute for the reach, to leave the under side free from obstructions, with a body to receive the cleanings, and series of dumping boards to dispose of them, furnishes the support for the operating machinery.

The process of cleaning commences, by the use of a combined rubbish rake and series of hoes; the shanks of which are fastened to the rake teeth in such a manner as to permit of lowering them as they wear by use, to gather foreign litter and loosen substances that adhere to the pavement, to prevent clogging the brush and elevator and relieve the brush from loosening the debris; thus reducing its wear and the power required to drive it. The teeth of the rake are set in a pipe revolving in eye-bolts set in the extension of the frame, and are curled to increase their elasticity, and to receive a pipe smaller than their curls, to receive levers on each side, which are attached to the main levers of the machine by a rod to operate them. 1. is the eye-bolt pipe. 2 the curl of the teeth. 3 the pipe to receive the levers, 4 the series of hoes, 5 the operating levers and 61 the extension of the frame.

A large rotating expandible vacuum brush, that can be maintained at substantially the same size, follows to throw and shove the cleanings over an apron through a channel fitted to the circle of the brush, into the pocket of the tube of the elevator. This brush is set at right angles to the curb and consists of a frame keyed on a shaft, with spokes held in position by a band, extending through separate brush boards, to near the end of the bristles of the brush. Pinion wheels are set on the band, which mesh into one side of the expanding bars, that incase the spokes above the band, and also into a large expanding wheel that slides under the spokes, the expanding bars being fastened to the brush boards. The ends of the pinion wheel are square, to receive a wrench, and when one is turned it turns the expanding wheel, which turns all of the others, and lifts up the expanding bars to which the brush boards are attached, thus instantly expanding the brush. The expanding bars may be held in their adjusted position by any suitable locking means. The bristles of the brush are set so as to press against each other at their ends, on the sides of the brush-boards, and the bristles near the ends of the brush-boards extend about six inches beyond their ends when of full size, and about two inches when reduced to their shortest length. A disk is fastened to the inside of the main levers, which furnish the arm of the brush, and the extended bristles are pressed together in front of the curb, making the brush stronger where the most of the cleanings accumulate, and the disk is beveled above the curb, thus releasing the bristles to their natural position. The braces of the frame holding the disk, are extended above it to receive the cover over the brush, to prevent the escape of dust, which covers the pocket of the elevator, and the entire elevator if desired. As the brush whirls it creates a suction which takes up the fine dust that an ordinary brush will not remove, which is prevented from being drawn into the center of the brush by a canvas between the brush boards, thus accomplishing all that could be accomplished by a vacuum cleaner. 6 is the frame of the brush, 7 the brush boards, 8 the pinion wheels, 9 the expanding bars, 10 the expanding wheel, 11 a locking bar, and 12 the vacuum cover, 13 the brush disk, 14 the cover or the brush frame, to receive a cover to the entire machine and make it dustless and sanitary. 62 is the band between the spokes and 67 plates to support the expanding wheel.

The elevator consists of three shafts, with three drums with faces fitted to the links of endless chains, on the upper and lower shafts, and three large sprockets on the center one, set on a shaft high enough to permit the elevator to be run by them and prevent the interlocking of the brackets, which are carried by the links of the chains, and slide the cleanings up an inclined plane which is the bottom of the tube of the elevator; which has a circular pocket at its lower end, that extends out beyond the ends of the brackets, far enough to receive the cleanings from the brush, carried to it over the apron that trails on the ground before the brush, through the channel, which is hinged to the pocket where it meets the disk of the brush. The pocket is beveled about a foot on its ends, to cause the cleanings to fall within the line of the brackets by gravity and the jar of the vehicle. The channel has sides above the curb, and flanges above it, and is fitted to the curve of the brush, thus preventing injury to the channel by obstructions. The brush, channel and apron, and pocket of the elevator, all extend beyond the track of the vehicle, far enough to permit them to clean the gutters, which is the most difficult portion of the process and important feature of my invention. A combined comb and scraper is set just above the center of the brush, the teeth of which pass through the ends of the bristles of the brush and the base of the teeth is a scraper; and these combined keep the brush clean and cause the dirt to fall into the pocket of the elevator. Two spiral springs hold them in position when the brush is raised and lowered. Another brush in circular form is set in the upper end of the tube that cleans the brackets, and causes the cleanings to fall into the body of the vehicle, and these combined keep the machine in working condition. 15 is the center shaft, 16 the sprockets, 17 the pocket, 18 the channel, 19 the apron, 20 the combined comb and scraper, and 21 the bracket brush. 63 is the brackets, 64 the comb scraper blade, 65 the teeth, and 66 the springs.

A guide wheel is set in a clevis on the end of a cross bar on an extension of the frame, which may be held in operative position by any appropriate means runs on the face of the curb, on a line with the end of the brush when in the gutter, which holds the hind wheels about four inches from the curb, and when not in use it is folded back on the cross bar. An indicator wheel is hung loosely on a vertical shaft in front, which is bent so as to play before an index scale, before the operator, which enables him to determine the position of the brush. 22 is the guide wheel, 23 the indicator and 24 the index, 68 the clevis, 50 the leveler, and 70 the cross bar.

Two main levers, one on each side of the machine, are held in position by staple brackets, on them interlocking with others fastened to the frame, and they furnish the arms of the brush, and carry short shafts set in detachable boxes which carry gears on one end and sprockets on the other, the gears meshing into those on the hind wheel of the vehicle, which drive the brush on one side and the elevator on the other. Two of these interlocking brackets are bolted to the frame of the vehicle one on each side of the hind wheels, and two others opposite to them are bolted to the main levers, and those on the frame of the body slide through those on the levers, and are fitted closely so as to hold the gears on the short shafts on the levers directly over the gears on the wheels, and also hold the revolving brush at a uniform distance from the track of the wheels and on a line with the curb guidewheels. These short shafts create a differential, and permit the space under the body to be free from obstructions, and permit distributing and dumping the cleanings. These main levers also operate the channel and apron, and rake and hoes. They are connected at the top by a bar, and rods from their lower ends receive another bar, to the center of which a wire rope is attached to lift the brush, and permit it to tilt endwise, to accommodate itself to the slant of the pavement. This rope extends over rollers, to a spiral spring with a chain through it to limit its expansion, and has tackle blocks in it, and it extends to the front to a drum at the front of the machine, operated by a ratchet and hand lever and pawl and foot lever; thus drawing the main levers down at the front and lifting them in the rear, to supplement their leverage. These main levers are fulcrumed on a shaft through the machine, and have slotted boxes to permit them to play in unison with the spiral spring in the lifting rope; and both regulate the tension of the revolving brush. The fulcrum shaft is strongly braced to sustain the strain from the friction of the brush and hold the gears in position. 25 is the main levers. 26 the slotted fulcrum box, 27 the short shafts, 28 the gears, 29 the lever-guides or brackets. 30 the sprockets, 31 the front bar, 32 the rear lifting bar, 33 the rope, 34 the stop chain spring, 35 the tackle blocks, 36 the front shaft, 37 the ratchet, 38 the pawl, 39 the foot lever, and 40 the supplemental lever.

The load may be dumped, or it may be distributed when the cleanings are used for grading purposes, by several dumping boards all opening in the same direction, and operated by separate levers with a rod or pipe on their lower ends, extending across under the body which slides on the hinges of the boards. The levers are united at their upper ends by a bar, which receives ropes that are wound around drums on a shaft, with a ratchet and pawl with a spiral spring and foot lever and hand lever. 41 are the dumping boards, 42 their levers, 43 their sliding pipes, 44 their rope bars, 45 the drums, 46 the ratchet, 47 the pawl, 48 the operating lever, and 70 the hinges. If the boards do not drop by the weight of the load, the rope around the wheel 49 is used to operate them.

When the load is dumped in piles, they are higher than the channel and pocket of the elevator, and to protect them levelers are provided, consisting of steel plates on the cross bar of the extension of the frame, to permit driving over the load when the cleanings are used for grading purposes, and to save leveling by hand. 50 and 51 are the levelers.

Chains from the lifting bar of the brush to the upper frame are used to sustain its weight, when being driven to and from the place where used, being 52.

An odometer 53, determines the miles traveled, from which to compute the yardage cleaned.

A seat with springs is provided for the operator being 54.

The space under the seat can be utilized for carrying tools, used in expanding the brush and operating the machine.

The capacity of the body 55, is about seventy five cubic feet, and the door 56 is used to inspect the load, and the door 57 to load the debris gathered by the rake.

The brake 58, is operated by the lever 59 at the front. As the cleanings are loosened before sweeping, the power required to operate the rake, and hoes, sweeper and elevator combined, is less than that required by the ordinary sweeper alone, which also loosens them, and an extra horse making a three horse team, is sufficient for the largest size, and but one horse or a motor cycle used as a tractor, for the size that is used to clean alleys and collect manure, or a separate tractor may be used for the largest size.

The merits of this invention, and improved method of efficiently performing the entire process, of cleaning any pavement, in any condition, with a single machine, operated while cleaning by a single operator, with a single supplemental lever, and that does uniform work, can be run at a uniform rate of speed, by the use of a uniform amount of power; cannot be understood except by contrasting its work with the methods by which the work has heretofore been performed.

Ordinarily the street is first sprinkled, for the purpose of facilitating loosening the materials that adhere to the pavement, finally loosened by the brush or scrubber, which creates mud, and forms windrows in the gutters, as diagonal brushes or scrubbers are used, where the most of the cleanings have accummulated. This requires a strong tension on the brush, or scrubber, which rapidly wears them out and requires a great amount of power. The water carries much of the loosened materials into the basins of the sewers, which has to be removed by hand. The wind-rows are then swept into piles, by hand brushes at great expense, and afterward loaded into wagons, which are obliged to stop to each pile at great loss of time, and afterward carted to the place of deposit. The sprinkling, or scrubbing, hand sweeping, loading and depositing constituting five distinct steps in the process, which is better done by this machine alone; as it requires but one team and one operator, instead of the numerous implements, machines, wagons, and laborers by the ordinary process.

Its novelty consists in assembling in their proper relations the several parts, each performing its portion of the process of cleaning streets, and all combined coöperating to perform the entire process; so as to constitute a single machine, constituting the general combination; and also of sub-combinations, some of which are mechanical, because of their juxtaposition to each other of several parts, and others coöperative combinations, because they contribute to perform particular portions of the process; and some of the parts are either new, or improvements upon other similar features embraced in different combinations. The channel and pocket of the elevator are mechanically combined with the other parts, contributing to place the cleanings where they can be elevated; but the slotted boxes for the fulcrum of the main levers are coöperatively combined with the spring in the brush lifting rope, set in the center of the lifting bar, all contributing to adjust the brush to the slant and irregular surface of the pavement, and the comb scraper and bracket brush together, keep the machine in working order, and the guide-wheel and indicator wheel combined, fix and determine the position of the machine with reference to the curb; and the coöperation of the main levers with all of the operating machinery, made as one operator to operate with the single supplemental lever the entire machine, when it is in operation cleaning, and creates a material combination.

In constructing the machine, care should be taken to set all boxes on the outside of the frame, where they can be conveniently oiled, and will be free from dust.

Particular attention is called to the relative positions of the guide wheel, hind wheels of the vehicle, and position of the bristles of the brush on the curb. Also to the narrow overlapping does set diagonally to permit the dirt to flow over and between them, and throwing the dirt out of the gutters and toward the center of the elevator.

I am aware that parts more or less similar to some of the elements of my machine have been used on other machines, but I am not aware that any other machines have these parts arranged in the same manner, or that they are of the same specific construction.

I have described what I conceive to be the best mode of constructing my machine, and the several parts thereof; but I do not limit myself to the particular form or mode of operation described. Obviously any equivalent device may be substituted for each of the various elements, and the machine may be made of any size, and be drawn by animals or by a mechanical tractor.

None of the subect matter embraced in my other application, or in the amendments thereof, dated the twenty-sixth day of January, 1914, and filed as of January fifteenth, 1915, Serial Number 2505, relating to a scarifier and grader, and roller, and sprinkler flusher and cleaner, and additional body, is included in this application, and all other subject matter embraced in both applications, is claimed in this one alone, together with the additional subject matters in this application, specifications and drawings.

Having thus fully shown and described my invention, what I claim and desire to secure by Letters Patent is:

1. In a street cleaner, a wheeled frame, a combined rake and scraper carried beneath said frame; a pivoted channel and apron at the rear of the frame, an elevator extending upwardly therefrom; an extended elevator pocket with beveled ends; a pair of main levers pivoted intermediate their length on said frame; interlocking brackets on said frame and levers to hold them in position; a large revolving expandible vacuum brush, on the rear ends of said levers, operating over said channel and apron; gearing mounted on short differential shafts, on said main levers in rear of the pivot, driven from the adjacent traction wheel; driving means from one set of gearing to the elevator and from the other set to the brush; connections from the main levers to the rake and scraper and to the channel and apron; and means for lowering the forward ends of the main levers and lifting them in the rear, whereby all of the working members may be simultaneously thrown out of action.

2. In a street cleaner, a vehicle body, a pair of main levers pivoted intermediate their length to the body by means of a transverse shaft mounted in slotted boxes; a large rotating expandible vacuum brush, carried by the rear ends of said levers; a supporting bar connected at its ends to the rear ends of said levers; a cable connected to the middle of the bar, and having an elastic tension device, and means for operating the cable.

3. In a street cleaner, a transverse bar pivoted thereto; a series of spring teeth connected to said bar; each tooth having a loop therein; a pipe passing through the loops; operating means connected to said pipe; a series of inclined hoes carried by the teeth, in the rear thereof, each hoe being inclined inwardly to direct the material toward the center of the machine.

4. In a street cleaner, a large rotatable expandible vacuum brush, a comb scraper therefor, comprising a pivoted scraper blade, extending approximately to the rim of the brush, a series of teeth attached to the blade and projecting into the brush, and a spring attached to each side of the comb scraper and extending to the fixed member, whereby the comb scraper is yieldingly held in position, and bracket brush at the upper end of the elevator.

5. In a street cleaner, an elevator, an extended elevator pocket with beveled ends;

a receptacle to which the elevator delivers; means to distribute and dump the contents of said receptacle; a leveling blade adjacent the dumping means, and a second leveling blade adjacent the elevator pocket, and projecting below the level thereof.

6. In a street cleaner, a vehicle, means for guiding the same, a pair of main levers pivoted intermediate their length to said vehicle and held in position by interlocking brackets; a large revolving expandible vacuum brush, carried by the rear ends of said levers; said brush being wider than the vehicle; and bristles on the ends of the brush extending outwardly at an angle; an open center disk carried by the levers adjacent the ends of the brush, the lower side of said disk being inwardly extended, and also being cut off to form a horizontal lower edge, whereby the machine is adapted to clean gutters.

JOHN WILBUR PARROTT.